US012764688B2

(12) United States Patent
Bi et al.

(10) Patent No.: US 12,764,688 B2
(45) Date of Patent: Oct. 13, 2026

(54) TIMING DETERMINATION METHOD AND DEVICE, COMMUNICATION NODE AND STORAGE MEDIUM

(71) Applicant: ZTE CORPORATION, Shenzhen (CN)

(72) Inventors: Feng Bi, Shenzhen (CN); Weimin Xing, Shenzhen (CN); Youxiong Lu, Shenzhen (CN); Ting Miao, Shenzhen (CN); Wenhao Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 459 days.

(21) Appl. No.: 18/260,280

(22) PCT Filed: Dec. 30, 2021

(86) PCT No.: PCT/CN2021/142891

§ 371 (c)(1),
(2) Date: Jul. 3, 2023

(87) PCT Pub. No.: WO2022/143871

PCT Pub. Date: Jul. 7, 2022

(65) Prior Publication Data

US 2024/0064675 A1 Feb. 22, 2024

(30) Foreign Application Priority Data

Jan. 4, 2021 (CN) ......................... 202110003207.4

(51) Int. Cl.
*H04W 56/00* (2009.01)

(52) U.S. Cl.
CPC ............................... *H04W 56/0045* (2013.01)

(58) Field of Classification Search
None
See application file for complete search history.

(56) References Cited

U.S. PATENT DOCUMENTS

| | | | | |
|---|---|---|---|---|
| 12,137,425 | B2 * | 11/2024 | Dortschy .......... | H04W 56/0025 |
| 2010/0177807 | A1 * | 7/2010 | Zhang ................. | H04L 27/2655<br>375/211 |

(Continued)

FOREIGN PATENT DOCUMENTS

| | | | | |
|---|---|---|---|---|
| BR | 112021016054 A2 * | 10/2021 | ........ | H04W 56/0015 |
| CN | 110536407 A | 12/2019 | | |

(Continued)

OTHER PUBLICATIONS

International Search Report in Application No. PCT/CN2021/142891, dated Mar. 29, 2022, 4 pages, including translation.

(Continued)

*Primary Examiner* — Wutchung Chu
*Assistant Examiner* — Berhanu D Belete
(74) *Attorney, Agent, or Firm* — Morgan, Lewis & Bockius LLP

(57) ABSTRACT

Provided are a timing determination method and device, a communication node and a storage medium. The timing determination method includes: determining a timing parameter; and determining transmission timing of a target node according to the timing parameter, where the transmission timing includes at least one of a time difference between first timing and second timing, downlink transmit timing (DTT) or uplink transmit timing (UTT).

19 Claims, 8 Drawing Sheets

(56) References Cited

U.S. PATENT DOCUMENTS

| | | | | |
|---|---|---|---|---|
| 2011/0171949 | A1* | 7/2011 | Liao | H04W 56/0045 455/422.1 |
| 2012/0127964 | A1* | 5/2012 | Turtinen | H04W 56/0045 370/336 |
| 2013/0142106 | A1* | 6/2013 | Zhang | H04W 56/0045 370/315 |
| 2018/0091267 | A1* | 3/2018 | Kim | H04L 5/001 |
| 2020/0053682 | A1* | 2/2020 | Abedini | H04W 56/0045 |
| 2020/0059879 | A1 | 2/2020 | Nam et al. | |
| 2020/0120671 | A1 | 4/2020 | Axmon et al. | |
| 2020/0145952 | A1* | 5/2020 | Keskitalo | H04W 56/007 |
| 2021/0385776 | A1* | 12/2021 | Dahlman | H04W 56/0025 |
| 2022/0104155 | A1* | 3/2022 | Dortschy | H04W 56/0025 |
| 2022/0110044 | A1* | 4/2022 | Abedini | H04W 40/248 |
| 2022/0110077 | A1* | 4/2022 | Abedini | H04W 56/0045 |

FOREIGN PATENT DOCUMENTS

| | | | |
|---|---|---|---|
| CN | 111684840 | A | 9/2020 |
| CN | 111757455 | A | 10/2020 |
| CN | 111901863 | A | 11/2020 |
| CN | 112839376 | A | 5/2021 |

OTHER PUBLICATIONS

ZTE. "FL summary #1 on IAB case-1 timing", 3GPP TSG RAN WG1 Meeting #101-e, R1-2004666, Jun. 5, 2020.

First Office Action in Indian Application No. 202327052371, dated Sep. 4, 2025, 5 pages, including translation.

First Office Action in Chinese Application No. 2021100032074, dated May 16, 2026, 16 pages, including translation.

* cited by examiner

TIMING DETERMINATION METHOD AND DEVICE, COMMUNICATION NODE AND STORAGE MEDIUM

CROSS REFERENCE TO RELATED APPLICATIONS

This is a National Stage Application, filed under 35 U.S.C. 371, of International Patent Application No. PCT/CN2021/142891, filed on Dec. 30, 2021, which claims priority to Chinese Patent Application No. 202110003207.4 filed with the China National Intellectual Property Administration (CNIPA) on Jan. 4, 2021, the disclosure of which is incorporated herein by reference in its entirety.

TECHNICAL FIELD

The present application relates to a wireless communication network, for example, a timing determination method and device, a communication node and a storage medium.

BACKGROUND

In a new radio (NR) system, an integrated access and backhaul (IAB) technology is an efficient network densification means. A link between an IAB node and a parent node (or an upstream node) is referred to as a backhaul link (BL), and a link between the IAB node and a child node (or a downstream node) or a link between the IAB node and user equipment is referred to as an access link (AL), where the parent node may also be an IAB node, or may be a donor node (DN), for example, a Donor NodeB (gNodeB, gNB). The IAB node has two functions: an integrated access and backhaul mobile termination (IAB-MT) for communicating with the parent node and an integrated access and backhaul distributed unit (IAB-DU) for communicating with the downstream node. The IAB node supports a simultaneous reception and transmission, and the following multiplexing manners may be used between the BL and the AL: time-division multiplexing (TDM), frequency-division multiplexing (FDM) and space-division multiplexing (SDM).

Theoretically, downlink transmit timing (DL Tx Timing, DTT) of the IAB-DU can be determined on the basis that downlink receive timing (DL Rx Timing, DRT) of the IAB-MT is advanced forward by one-half (denoted as TA/2) of a timing advance (TA), thereby maintaining an alignment of DTT between the IAB node and the parent node. However, since an offset is between uplink receive timing (UL Rx Timing, URT) of the parent node and DTT of the parent node, an alignment between different nodes is more complex in actual application, and transmission timing cannot be simply determined according to TA/2. In a process of simultaneous reception and transmission, if the transmission timing is not accurate, transmissions between nodes interfere with each other, thereby affecting transmission efficiency.

SUMMARY

The present application provides a timing determination method and device, a communication node and a storage medium to accurately determine transmission timing of an IAB node and improve transmission efficiency.

Embodiments of the present application provide a timing determination method. The timing determination method includes the following.

A timing parameter is determined.

Transmission timing of a target node is determined according to the timing parameter, where the transmission timing includes at least one of a time difference between first timing and second timing, DTT or uplink transmit timing (UL Tx Timing, UTT).

Embodiments of the present application further provide a timing determination device. The timing determination device includes a parameter determination module and a timing determination module.

The parameter determination module is configured to determine a timing parameter.

The timing determination module is configured to determine transmission timing of a target node according to the timing parameter, where the transmission timing includes at least one of a time difference between first timing and second timing, DTT or UTT.

Embodiments of the present application further provide a communication node. The communication node includes a memory, a processor and a computer program stored in the memory and executable by the processor, where the processor, when executing the program, implements the above timing determination method.

Embodiments of the present application further provide a computer-readable storage medium storing a computer program, where the program, when executed by a processor, implements the above timing determination method.

DETAILED DESCRIPTION

Figure 1:
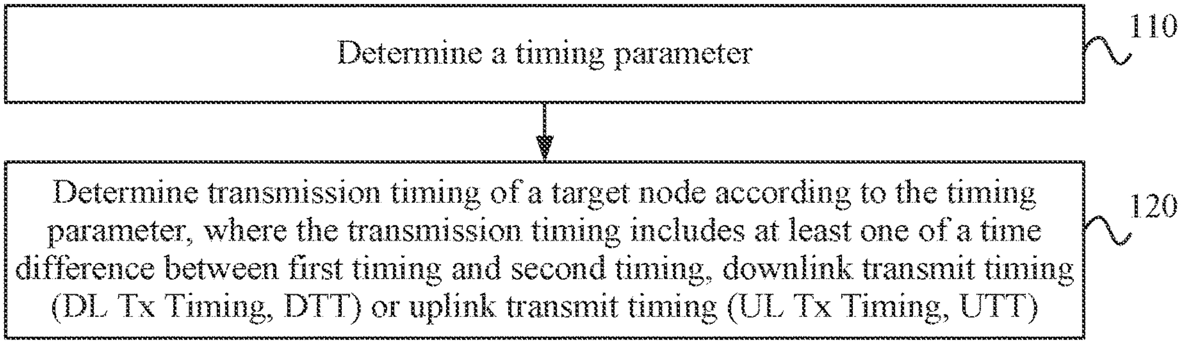
FIG. 1 is a flowchart of a timing determination method according to an embodiment.

The present application is described hereinafter in conjunction with drawings and embodiments. It is to be understood that specific embodiments described herein are intended to explain the present application and not to limit the present application. It is to be noted that if not in collision, the embodiments of the present application and features therein may be combined with each other in any manner. Additionally, it is to be noted that for ease of description, only part, not all, of structures related to the present application are illustrated in the drawings.

In the present application, a target node generally refers to an IAB node, or may be other types of nodes that support separate communication with an upstream node and a downstream node. An upper-level upstream node of the target node is referred to as a first parent node, which is, for example, a serving cell of the target node, and the first parent node may be an IAB node, or may be a DN. A next-level downstream node of the target node is referred to as a child node, and the target node may be a serving cell of the child node. If the first parent node also has an upper-level upstream node, the upper-level upstream node of the first parent node is referred to as a second parent node.

To maintain network synchronization and reduce mutual interference between nodes at all levels, an alignment of DTT, which is also referred to as an IAB-DU transmit timing alignment, needs to be maintained between the nodes at all levels. Several main timing modes between the nodes at all levels are described below.

First timing mode: DTT of the target node is aligned with DTT of the first parent node.

Second timing mode: the DTT of the target node is aligned with the DTT of the first parent node, and UTT of the target node is aligned with the DTT of the target node.

Third timing mode: the DTT of the target node is aligned with the DTT of the first parent node, and URT of the target node is aligned with DRT of the target node.

Fourth timing mode: the DTT of the target node is aligned with the DTT of the first parent node, and the URT of the target node is aligned with the UTT of the target node.

Fifth timing mode: the DTT of the target node is aligned with the DTT of the first parent node, and the DTT of the target node is aligned with the DRT of the target node.

In the embodiments of the present application, a timing determination method is provided. A target node can determine at least one of a time difference or DTT and UTT of the target node according to a timing parameter, so as to flexibly and accurately determine transmission timing, thereby improving efficiency and reliability of transmission.

FIG. 1 is a flowchart of a timing determination method according to an embodiment. As shown in FIG. 1, the method according to the present embodiment includes operations 110 and 120.

In 110, a timing parameter is determined.

In 120, transmission timing of a target node is determined according to the timing parameter, where the transmission timing includes at least one of: a time difference between first timing and second timing, DTT or UTT.

For the target node, if the target node intends to maintain synchronization with an upper-level first parent node of the target node, that is, to maintain a downlink timing alignment, the DTT of the target node needs to be advanced. A main object of determining the transmission timing of the target node according to the timing parameter is to determine the DTT. The timing parameter refers to a parameter that has an effect on the transmission timing of the target node. Since an offset is between URT and DTT of an upstream node, an alignment between nodes at all levels in different timing modes is complex. If downlink transmission is performed in advance only according to one-half of a timing advance indicated by the first parent node, the synchronization of the target node and the first parent node cannot be ensured. The timing parameter in the present embodiment can provide a basis for determining the transmission timing of the target node.

Determining the transmission timing of the target node may be determining a time difference (TD) between DTT and DRT of the nodes at all levels, may be determining the DTT of the target node, or may be determining DRT of the target node and obtaining the DTT on the basis of the DRT. For example, the target node calculates a time difference (denoted as TD) between the DTT and DRT of the target node based on a timing advance adjustment number $N_{TA}$ or a timing lag adjustment number $N_{TA}$, a timing argument index $T_{delta}$ notified by medium access control-control element (MAC-CE) signaling, a timing argument offset $N_{delta}$ corresponding to a frequency range FR1 or FR2 and/or a timing argument granularity $G_{step}$ corresponding to a set frequency range. The formula is as follows: $TD=(N_{TA}/2+N_{delta}+T_{delta}\cdot G_{step})\cdot T_c$, where $T_c$ denotes a time unit, $T_c=1/(\Delta f_{max}\cdot N_f)$, $\Delta f_{max}=480\text{-}10^3$ Hz, $N_f=4096$, and $(N_{TA}/2+N_{delta}+T_{delta}\cdot G_{step})$ denotes a timing advance adjustment number or a timing lag adjustment number. Advanced by TD on the basis of the DRT, the DTT of the target node can be determined. It is to be noted that TD may be a positive value, indicating that the DTT of the target node is in advance of the DRT, or may be a negative value, indicating that the DTT of the target node lags behind the DRT.

In an embodiment, the timing parameter includes at least one of a timing advance, a timing argument or a time difference parameter.

The timing parameter is, for example, one or more of the timing advance, the timing argument or the time difference parameter. The timing advance is denoted as TA, indicating the advanced time of the DTT of the target node compared with the DRT, and TA is a positive value or a negative value, indicating that the DTT is in advance of the DRT or lags behind the DRT, respectively. The timing argument is denoted as T_delta, indicating that an additional offset exists on the basis of the timing advance. The time difference parameter indicates a time difference between nodes at different levels related to the target node or a time difference of different transmission timing of the target node, for example, propagation time between the first parent node and a second parent node or a time difference between the DTT of the target node and the DRT of the node determined by the first parent node.

In an embodiment, the transmission timing includes at least one of the following: the first timing is DTT of a serving cell or the first parent node, or the second timing is the DRT of the target node.

In the present embodiment, determining the transmission timing of the target node may be determining a time difference TD between the DTT of the serving cell or the first parent node and the DRT of the target node, and the time difference may be expressed by the following simplified formula: TD=TA/2+T_delta, that is, the time difference is determined according to the timing advance TA and the timing argument T_delta. Determining the transmission timing of the target node may also be determining the DTT of the target node: DTT=DRT−TD, that is, advancing forward by TD on the basis of the DRT; determining the transmission timing of the target node may also be determining the DRT of the target node, and the DTT may also be obtained on the basis of the DRT.

In an embodiment, the timing parameter includes a timing advance, and the method further includes the following.

In 101, the timing advance is determined according to at least one of a timing advance offset, a timing advance index or a timing advance granularity.

In the present embodiment, the timing advance TA can be determined according to one or more of the following parameters:

(1) a timing advance offset $N_{TA,offset}$ (if $N_{TA,offset}$ is a negative value, $N_{TA,offset}$ denotes a timing lag offset) including $0 \cdot T_c$, $13792 \cdot T_c$, $25600 \cdot T_c$, and $39936 \cdot T_c$;

(2) the timing advance index related to the timing advance adjustment number $N_{TA}$ or the timing lag adjustment number $N_{TA}$; or (3) the timing advance granularity related to the timing advance adjustment number $N_{TA}$ or the timing lag adjustment number $N_{TA}$.

In addition, the timing argument may be related to the following parameters: a subcarrier spacing Δf, μ denotes a subcarrier spacing index, and $\Delta f = 2^{\mu} \cdot 15$ kHz; FR1 denotes a first frequency range, specifically 410-7125 MHz; FR2 denotes a second frequency range, specifically 24250-52600 MHz.

$N_{TA}+N_{TA,offset}$ indicates a time advance or a time lag of uplink transmission of the target node relative to downlink reception. In the case where $N_{TA,offset}=0$, $N_{TA}$ is the time advance or the time lag of the uplink transmission of the target node relative to the downlink reception.

In an embodiment, the timing parameter includes a timing argument, and the method further includes the following.

In operation 102, the timing argument is determined according to at least one of a timing argument offset, a timing argument index or a timing argument granularity.

In the present embodiment, the timing argument T_delta can be determined according to one or more of the following parameters:

(1) the timing argument offset $N_{delta}$;

(2) the timing argument index $T_{delta}$; or (3) the timing argument granularity $G_{step}$.

In an embodiment, the timing parameter includes a time difference parameter, where the time difference parameter includes at least one of the propagation time between the first parent node and the second parent node;

a time difference between the first timing and the second timing determined by the first parent node;

the number of advanced or lagged orthogonal frequency-division multiplexing (OFDM) symbols of third timing of the target node relative to fourth timing of the target node;

time of the advanced or lagged OFDM symbols of the third timing of the target node relative to the fourth timing of the target node; or an advanced or lagged subcarrier spacing of the third timing of the target node relative to the fourth timing of the target node.

In the present embodiment, the first timing is the DTT of the serving cell or the first parent node, and the second timing is the DRT of the target node. The third timing and the fourth timing are used for describing a time difference between different transmission timing of the target node, for example, a time difference of the UTT of the target node relative to the timing advance, a time difference of the UTT of the target node relative to the DTT, a time difference of URT of the target node relative to the DRT, a time difference of the UTT of the target node relative to the URT and/or a time difference of the DTT of the target node relative to the DRT.

In an embodiment, the transmission timing includes the time difference between the first timing and the second timing, where the time difference is determined according to at least one of the following manners:

$$TD=TA/2;\ TD=TA;$$

$$TD=TA/2-Tg/2;\ TD=TA/2+T\_delta;$$

$$TD=-|TA|/2+Tg/2;\ TD=-|TA|/2+T\_delta;$$

$$TD=-TA/2+Tg/2;\ TD=-TA/2+T\_delta;$$

$$TD=TA/2\pm SN\cdot ST;\ TD=TA+SN\cdot ST;$$

$$TD=TA/2-Tg/2\pm SN\cdot ST;\ TD=TA/2+T\_delta\pm SN\cdot ST;$$

$$TD=-|TA|/2+Tg/2\pm SN\cdot ST;\ TD=-|TA|/2+T\_delta\pm SN\cdot ST;$$

$$TD=-TA/2-Tg/2+SN\cdot ST;\ TD=-TA/2+T\_delta\pm SN\cdot ST;$$

$$TD=TA/2+TPup/2;\ TD=TA/2+TDup/2;$$

$$TD=-|TA|/2+TPup/2;\ TD=-|TA|/2+TDup/2;$$

$$TD=-TA/2+TPup/2;\ TD=-TA/2+TDup/2;$$

$$TD=TA/2-(SN-ST-TPup)/2;\ TD=TA/2-(SN\cdot ST-TDup)/2;\ \text{or}$$

$$TD=TA/2-TPup/2;\ TD=TA/2-TDup/2.$$

In the present embodiment, TD denotes the time difference between the first timing and the second timing, the first timing is the DTT of the serving cell or the first parent node, and the second timing is the DRT of the target node; TA denotes the timing advance, $T_g$ denotes a time difference between URT of the first parent node and the DTT of the first parent node, SN denotes the number of advanced or lagged OFDM symbols of the third timing of the target node relative to the fourth timing of the target node, ST denotes the time of the advanced or lagged OFDM symbols of the third timing of the target node relative to the fourth timing of the target node, TPup denotes the propagation time between the first parent node and the second parent node, TDup denotes the time difference between the first timing and the second timing determined by the first parent node, and T_delta denotes the timing argument.

In an embodiment, the transmission timing includes a timing advance, where the timing advance is determined according to at least one of the following manners:

$$TA=N_{TA}\cdot T_c;\ TA=(N_{TA}+N_{TA,offset})\cdot T_c;\ TA=-N_{TA}\cdot T_c;\ \text{or}\ TA=-(N_{TA}+N_{TA,offset})\cdot T_c.$$

In the present embodiment, TA denotes the timing advance, $N_{TA}$ denotes a timing advance adjustment number or a timing lag adjustment number, $N_{TA,offset}$ denotes a timing advance offset or a timing lag offset, and $T_c$ denotes a time unit.

In an embodiment, the transmission timing includes a timing argument, where the timing argument is determined according to at least one of the following manners:

$$T\_\text{delta}=(N_{delta}+T_{delta}\cdot G_{step})\cdot T_c;$$

$$T\_\text{delta}=(-N_{TA,offset}/2+N_{delta}+T_{delta}\cdot G_{step})\cdot T_c;\text{ or}$$

$$T\_\text{delta}=(N_{TA,offset}/2+N_{delta}+T_{delta}\cdot G_{step})\cdot T_c.$$

In the present embodiment, T_delta denotes the timing argument, $N_{TA}$ denotes a timing advance adjustment number or a timing lag adjustment number, $N_{TA,offset}$ denotes a timing advance offset or a timing lag offset, $T_c$ denotes a time unit, $T_{delta}$ denotes a timing argument index value, $N_{delta}$ denotes a timing argument offset, and $G_{step}$ denotes a timing argument granularity.

The case where the transmission timing is determined according to the timing parameter is described below by using examples. In the following examples, IAB1, IAB2 and IAB3 are all IAB nodes, DgNB is a DN, DgNB is an upper-level upstream node of IAB1, IAB1 is an upper-level upstream node of IAB2, and IAB2 is an upper-level upstream node of IAB3.

Example One (for a First Timing Mode)

Sub-Example One of Example One

Figure 2:
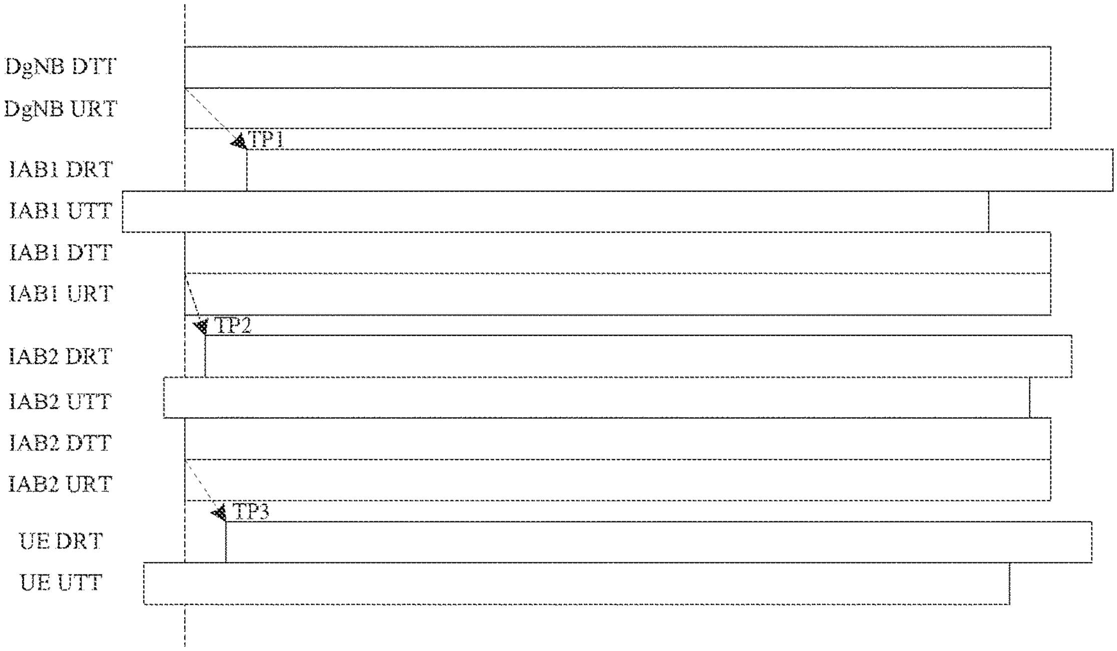
FIG. 2 is a schematic diagram illustrating a slot-level alignment of URT and DTT of a first parent node according to an embodiment.

FIG. 2 is a schematic diagram illustrating a slot-level alignment of URT and DTT of a first parent node according to an embodiment. As shown in FIG. 2, a target node is IAB1, the first parent node is DgNB, the URT of DgNB is aligned with the DTT of DgNB, and a timing advance TA≥0. In this case, IAB1 may determine a time difference (TD) between first timing (DTT) and second timing (DRT) and further determine the DTT by using the following manner:

$$\text{TD}=\text{TA}/2,\text{ where}$$

$$\text{TA}=N_{TA}\cdot T_c\text{ or TA}=(N_{TA}+N_{TA,offset})\cdot T_c;$$

$$DTT=DRT-\text{TD}.$$

In addition, the target node is IAB2, the first parent node is IAB1, the URT of IAB1 is aligned with the DTT of IAB1, and the timing advance TA≥0. In this case, IAB2 may determine the TD and the DTT by using the same manner as IAB1 in sub-example one of example one.

Sub-Example Two of Example One

Figure 3:
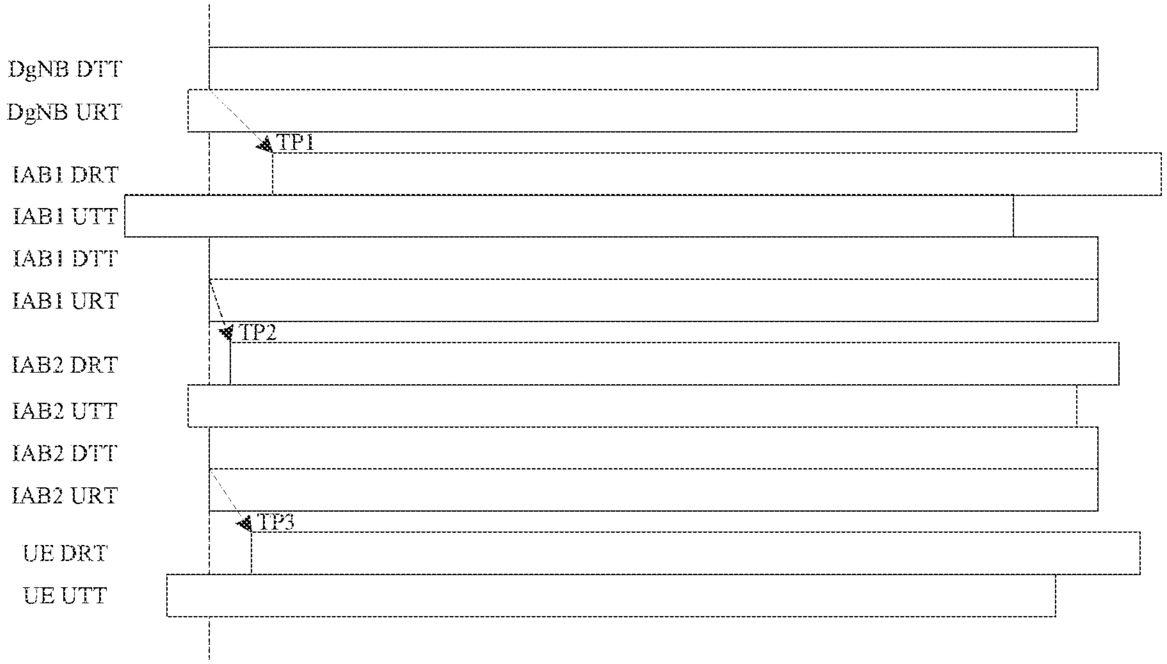
FIG. 3 is a schematic diagram illustrating a slot-level misalignment where URT of a first parent node is in advance of DTT of the first parent node according to an embodiment.

FIG. 3 is a schematic diagram illustrating a slot-level misalignment where URT of a first parent node is in advance of DTT of the first parent node according to an embodiment. As shown in FIG. 3, the target node is IAB1, the first parent node is DgNB, the URT of DgNB is in advance of the DTT of DgNB, the timing advance TA≥0, and −Tg/2=T_delta≤0. In this case, IAB1 may determine the time difference (TD) between the first timing (DTT) and the second timing (DRT) and further determine the DTT by using the following manner:

$$\text{TD}=\text{TA}/2-Tg/2\text{ or TD}=\text{TA}/2+T\_\text{delta},\text{ where}$$

$$\text{TA}=N_{TA}\cdot T_c\text{ or TA}=(N_{TA}+N_{TA,offset})\cdot T_c,$$

$$T\_\text{delta}=(N_{delta}+T_{delta}\cdot G_{step})\cdot T_c\text{ or }T\_\text{delta}=(-N_{TA,offset}/2+N_{delta}+T_{delta}\cdot G_{step})\cdot T_c;$$

$$DTT=DRT-\text{TD}.$$

In addition, the target node is IAB2, the first parent node is IAB1, the URT of IAB1 is aligned with the DTT of IAB1, and the timing advance TA≥0. In this case, IAB2 may determine the TD and the DTT by using the same manner as IAB2 in sub-example one of example one.

Sub-Example Three of Example One

Figure 4:
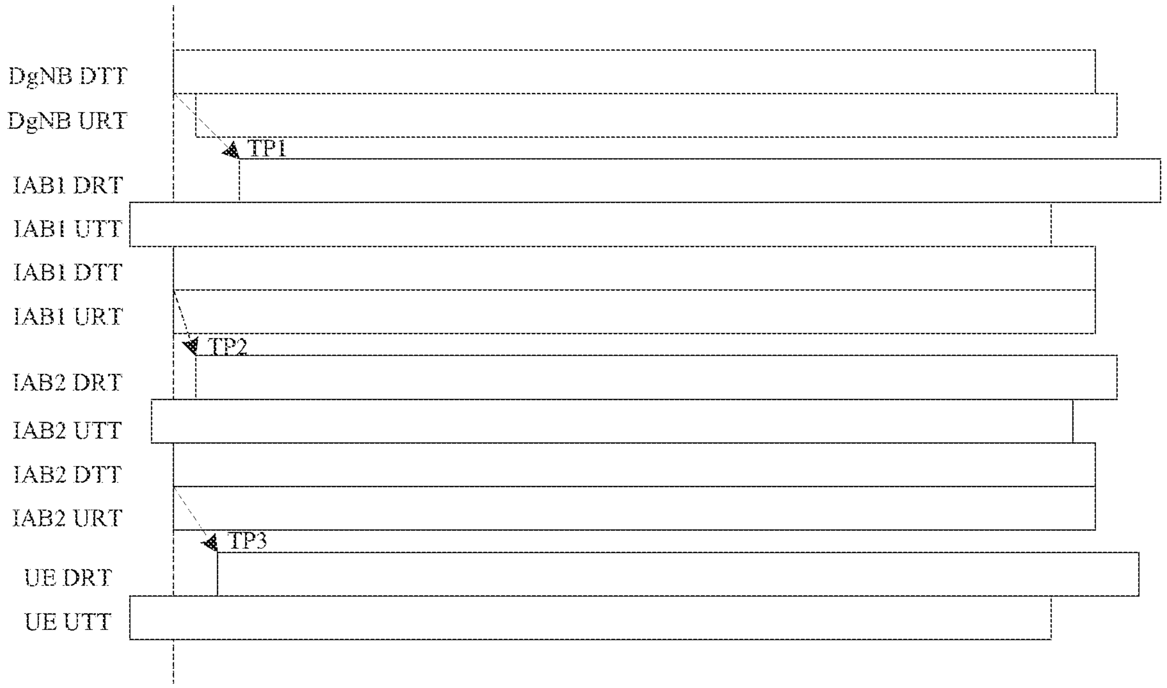
FIG. 4 is a schematic diagram illustrating a slot-level misalignment where URT of a first parent node lags behind DTT of the first parent node according to an embodiment.

FIG. 4 is a schematic diagram illustrating a slot-level misalignment where URT of a first parent node lags behind DTT of the first parent node according to an embodiment. As shown in FIG. 4, the target node is IAB1, the first parent node is DgNB, the URT of DgNB lags behind the DTT of DgNB, the timing advance TA≥0, and Tg/2=T_delta≥0. In this case, IAB1 may determine the time difference (TD) between the first timing (DTT) and the second timing (DRT) and further determine the DTT by using the following manner:

$$\text{TD}=\text{TA}/2+Tg/2\text{ or TD}=\text{TA}/2+T\_\text{delta},\text{ where}$$

$$\text{TA}=N_{TA}\cdot T_c\text{ or TA}=(N_{TA}+N_{TA,offset})\cdot T_c,$$

$$T\_\text{delta}=(N_{delta}+T_{delta}\cdot G_{step})\cdot T_c\text{ or }T\_\text{delta}=(-N_{TA,offset}/2+N_{delta}+T_{delta}\cdot G_{step})\cdot T_c;$$

$$DTT=DRT-\text{TD}.$$

In addition, the target node is IAB2, the first parent node is IAB1, the URT of IAB1 is aligned with the DTT of IAB1, and the timing advance TA≥0. In this case, IAB2 may determine the TD and the DTT by using the same manner as IAB2 in sub-example one of example one.

Sub-Example Four of Example One

Figure 5:
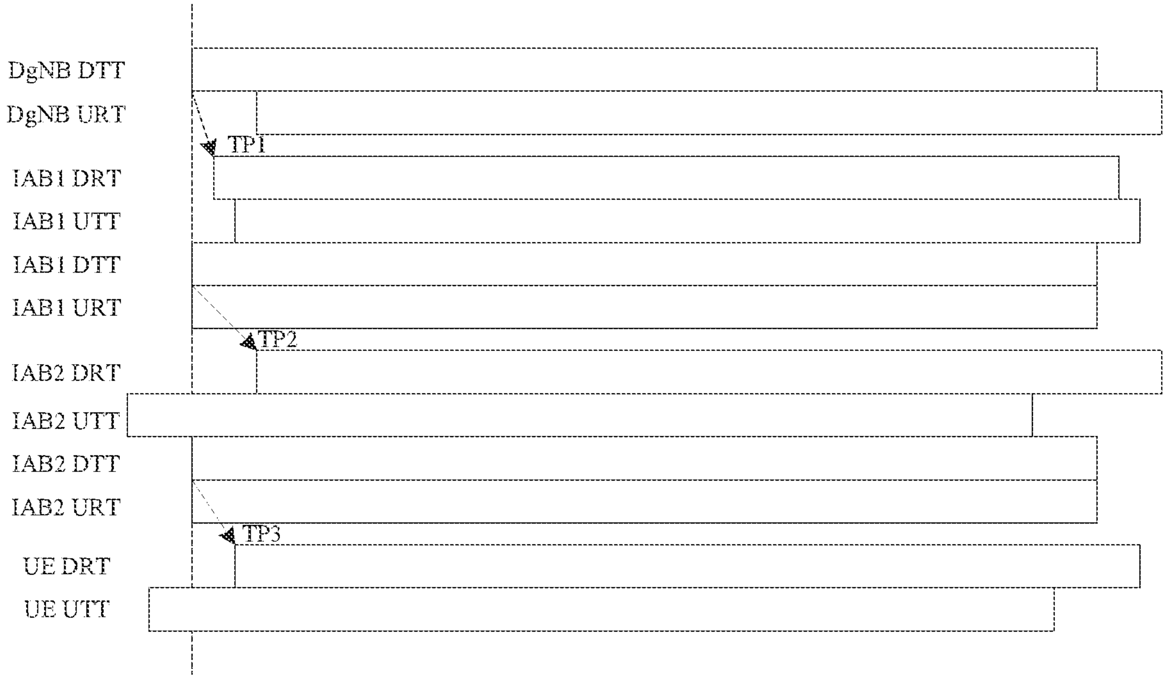
FIG. 5 is a schematic diagram illustrating a slot-level misalignment where URT of a first parent node lags behind DTT of the first parent node according to another embodiment.

FIG. 5 is a schematic diagram illustrating a slot-level misalignment where URT of a first parent node lags behind DTT of the first parent node according to another embodiment. As shown in FIG. 5, a target node is IAB1, the first parent node is DgNB, the URT of DgNB lags behind the DTT of DgNB, a timing advance TA≤0, and Tg/2=T_delta≥0. In this case, IAB1 may determine a time difference (TD) between first timing (DTT) and second timing (DRT) and further determine the DTT by using the following manner:

$$\text{TD}=\text{TA}/2+Tg/2\text{ or TD}=\text{TA}/2+T\_\text{delta}\text{ or TD}=-|\text{TA}|/2+Tg/2$$

$$\text{or TD}=-|\text{TA}|/2+T\_\text{delta}\text{ or TD}=-\text{TA}/2+Tg/2\text{ or TD}=\text{TA}/2+T_{delta},\text{ where}$$

$$\text{TA}=-N_{TA}\cdot T_c\text{ or TA}=-(N_{TA}+N_{TA,offset})\cdot T_c,$$

$$T\_\text{delta}=(N_{delta}+T_{delta}\cdot G_{step})\cdot T_c\text{ or }T\_\text{delta}=(N_{TA,offset}/2+N_{delta}+T_{delta}\cdot G_{step})\cdot T_c;$$

$$DTT=DRT-\text{TD}.$$

In addition, the target node is IAB2, the first parent node is IAB1, the URT of IAB1 is aligned with the DTT of IAB1, and the timing advance TA≥0. In this case, IAB2 may determine the TD and the DTT by using the same manner as IAB2 in sub-example one of example one.

Example Two (for a Second Timing Mode)

Sub-Example One of Example Two

Figure 6:
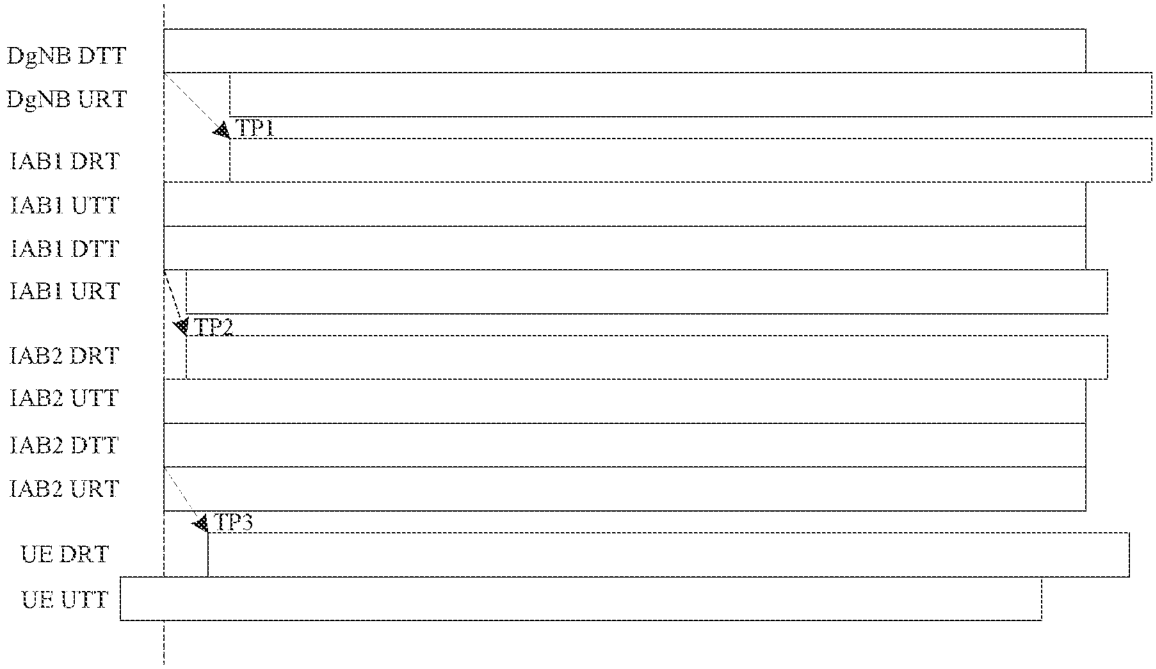
FIG. 6 is a schematic diagram illustrating a slot-level alignment of UTT and DTT of a target node according to an embodiment.

FIG. 6 is a schematic diagram illustrating a slot-level alignment of UTT and DTT of a target node according to an embodiment. As shown in FIG. 6, the target node is IAB1, a first parent node is DgNB, URT of DgNB lags behind DTT of DgNB, and a timing advance TA≥0. In this case, IAB1 may determine a time difference (TD) between first timing (DTT) and second timing (DRT) and further determine the DTT by using the following manner:

$$TD=TA, \text{ where}$$

$$TA=N_{TA}\cdot T_c \text{ or } TA=(N_{TA}+N_{TA,offset})\cdot T_c;$$

$$DTT=DRT-TD.$$

Alternatively, IAB1 may also determine the TD and the DTT by using the same method as IAB1 in sub-example three of example one.

In addition, the target node is IAB2, the first parent node is IAB1, URT of IAB1 lags behind DTT of IAB1, and the timing advance TA≥0. In this case, IAB2 may determine the TD and the DTT by using the same manner as IAB1 in sub-example one of example two.

Alternatively, IAB2 may also determine the TD and the DTT by using the same method as IAB1 in sub-example three of example one.

Sub-Example Two of Example Two

Figure 7:
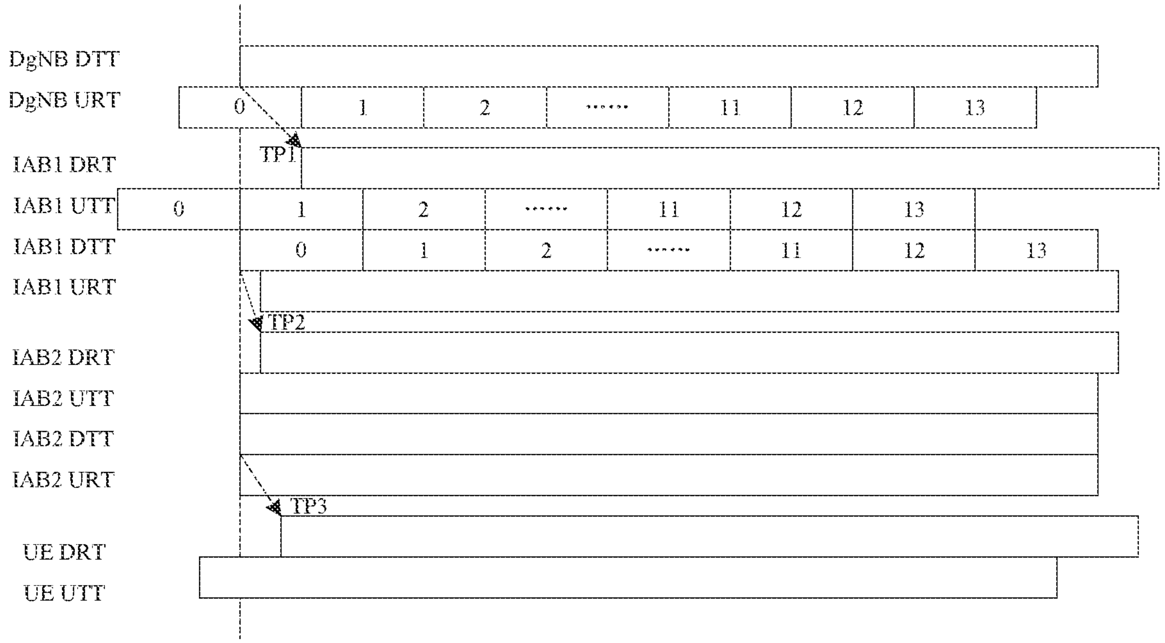
FIG. 7 is a schematic diagram illustrating a symbol-level alignment of UTT and DTT of a target node according to an embodiment.

FIG. 7 is a schematic diagram illustrating a symbol-level alignment of UTT and DTT of a target node according to an embodiment. As shown in FIG. 7, the target node is IAB1, the first parent node is DgNB, the URT of DgNB is in advance of the DTT of DgNB, and the timing advance TA≥0. In this case, IAB1 may determine the TD and further determine the DTT by using the following method:

$$TD=TA-SN\cdot ST, \text{ where}$$

$$TA=N_{TA}\cdot T_c \text{ or } TA=(N_{TA}+N_{TA,offset})\cdot T_c;$$

$$DTT=DRT-TD.$$

In the present sub-example, SN denotes the number of advanced OFDM symbols of the UTT of IAB1 relative to the DTT of IAB1; when SN is a negative value, SN denotes that the UTT of IAB1 is in advance of the DTT of IAB1, and when SN is a positive value, SN denotes that the UTT of IAB1 lags behind the DTT of IAB1; "SN·ST" may be uniformly denoted as "$T_{offset}$".

In addition, the URT of the first parent node DgNB is in advance of the DTT of DgNB, the timing advance TA≥0, and −Tg/2=T_delta≤0. In this case, IAB1 may determine the TD and further determine the DTT by using the following method:

$$TD=TA/2-Tg/2-SN\cdot ST \text{ or } TD=TA/2+T\_delta-SN\cdot ST, \text{ where}$$

$$TA=N_{TA}\cdot T_c \text{ or } TA=(N_{TA}+N_{TA,offset})\cdot T_c,$$

$$T_{delta}=(N_{delta}+T_{delta}\cdot G_{step})\cdot T_c \text{ or } T\_delta=(-N_{TA,offset}/2+N_{delta}+T_{delta}\cdot G_{step})\cdot T_c;$$

$$DTT=DRT-TD.$$

In the present sub-example, SN denotes the number of advanced OFDM symbols of the UTT of IAB1 relative to the DTT of IAB1; when SN is a negative value, SN denotes that the UTT of IAB1 is in advance of the DTT of IAB1, and when SN is a positive value, SN denotes that the UTT of IAB1 lags behind the DTT of IAB1; "SN·ST" may be uniformly denoted as "$T_{offset}$".

In addition, the target node is IAB2, the first parent node is IAB1, the URT of IAB1 lags behind the DTT of IAB1, and the timing advance TA≥0. In this case, IAB2 may determine the TD and the DTT by using the same method as IAB2 in sub-example one of example two.

In addition, for the case where the target node is IAB1, the first parent node is DgNB and the URT of DgNB is in advance of the DTT of IAB1, IAB1 may determine the TD and the DTT by using the same method as IAB1 in sub-example two of example one.

In addition, for the case where the target node is IAB2, the first parent node is IAB1 and the URT of IAB1 lags behind the DTT of IAB1, IAB2 may determine the TD and the DTT by using the same method as IAB2 in sub-example one of example two.

Example Three (for a Third Timing Mode)

Sub-Example One of Example Three

Figure 8:
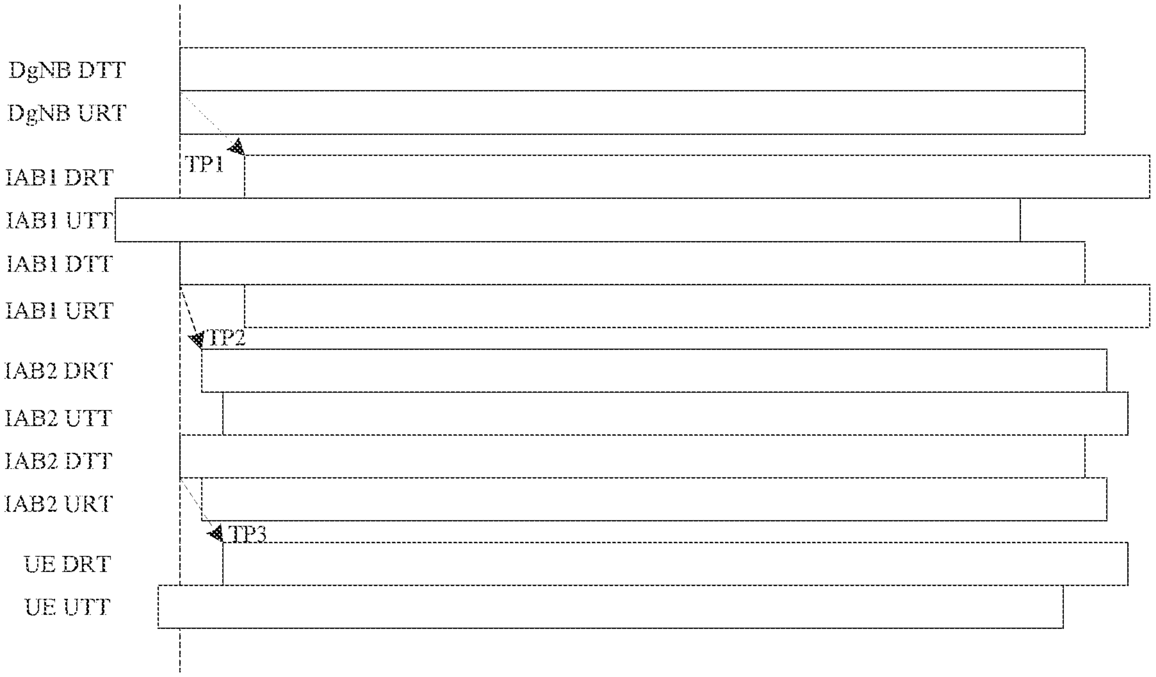
FIG. 8 is a schematic diagram illustrating a slot-level alignment of URT and DRT of a target node according to an embodiment.

FIG. 8 is a schematic diagram illustrating a slot-level alignment of URT and DRT of a target node according to an embodiment. As shown in FIG. 8, the target node is IAB1, a first parent node is DgNB, URT of DgNB is aligned with DTT of the parent node DgNB, and TA≥0. In this case, IAB1 may determine a TD and the DTT by using the same method as IAB1 in sub-example one of example one.

In addition, the target node is IAB2, the first parent node is IAB1, URT of IAB1 lags behind DTT of IAB1, and TA≤0. In this case, IAB2 may determine the TD and further determine the DTT by using the following manner:

$$TD=TA/2+TPup/2 \text{ or } TD=TA/2+TDup/2 \text{ or } TD=-|TA|/2+TPup/2$$

$$\text{or } TD=-|TA|/2+TDup/2 \text{ or } TD=-TA/2+TPup/2 \text{ or } TD=-TA/2+TDup/2, \text{ where}$$

$$TPup=TDup=TP1=TD1,$$

$$TA=-N_{TA}\cdot T_c \text{ or } TA=-(N_{TA}+N_{TA,offset})\cdot T_c;$$

$$DTT=DRT-TD.$$

In addition, for the case where the target node is IAB1, the first parent node is DgNB and the URT of DgNB is aligned with the DTT of DgNB, IAB1 may determine the TD and the DTT by using the same method as IAB1 in sub-example one of example one.

In addition, for the case where the target node is IAB2, the first parent node is IAB1 and the URT of IAB1 lags behind the DTT of IAB1, IAB2 may determine the TD and the DTT by using the same method as IAB1 in sub-example four of example one.

Sub-Example Two of Example Three

Figure 9:
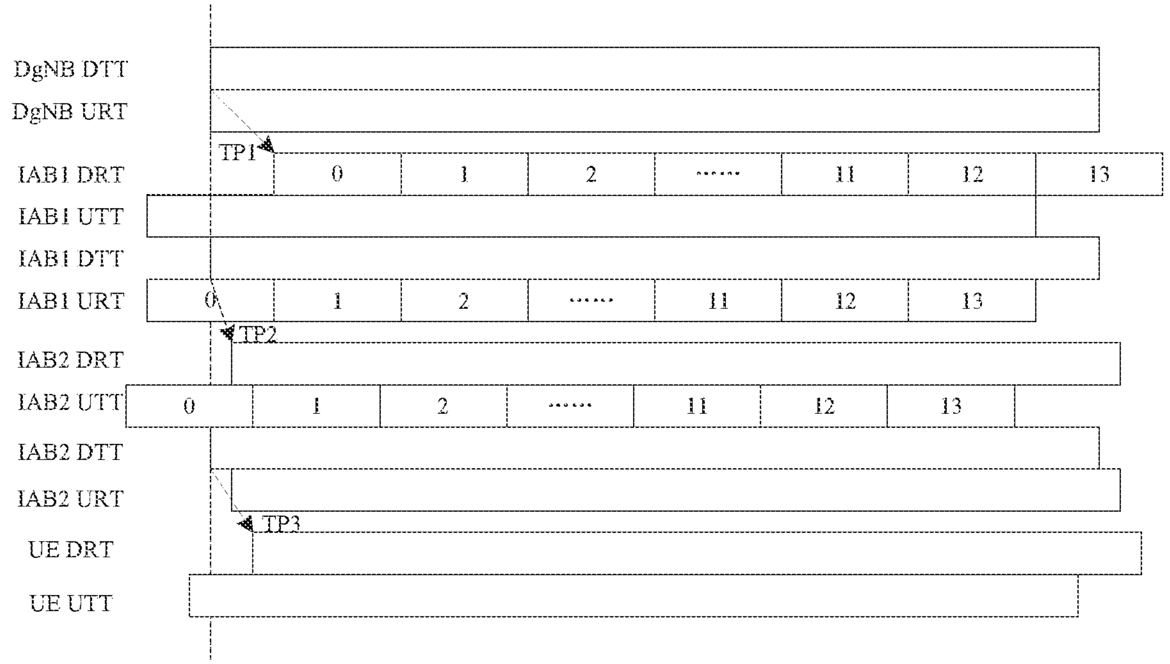
FIG. 9 is a schematic diagram illustrating a symbol-level alignment of URT and DRT of a target node according to an embodiment.

FIG. 9 is a schematic diagram illustrating a symbol-level alignment of URT and DRT of a target node according to an embodiment. As shown in FIG. 9, the target node is IAB1, the first parent node is DgNB, the URT of DgNB is aligned with the DTT of the parent node DgNB, and TA≥0. In this case, IAB1 may determine the TD and the DTT by using the same method as IAB1 in sub-example one of example one.

In addition, the target node is IAB2, the first parent node is IAB1, the URT of IAB1 is in advance of the DTT of IAB1, and TA≥0. In this case, IAB2 may determine the TD and the DTT by using the following method:

$$TD=TA/2-(SN\cdot ST-TPup)/2 \text{ or } TD=TA/2-(SN\cdot ST-TDup)/2, \text{ where}$$

$$TPup=TDup=TP1=TD1,$$

$$TA=N_{TA}\cdot T_c \text{ or } TA=(N_{TA}+N_{TA,offset})\cdot T_c;$$

$$DTT=DRT-TD.$$

In addition, the target node is IAB2, the first parent node is IAB1, the URT of IAB1 is in advance of the DTT of IAB1, TA≥0, and −Tg/2=T_delta≤0. In this case, IAB2 may determine the TD and the DTT by using the following method:

$$TD=TA/2-Tg/2-SN\cdot ST \text{ or } TD=TA/2+T\_delta-SN\cdot ST, \text{ where}$$

$$TA=N_{TA}\cdot T_c \text{ or } TA=(N_{TA}+N_{TA,offset})-T_c,$$

$$T_{delta}=(N_{delta}+T_{delta}\cdot G_{step})\cdot T_c \text{ or } T\_delta=(-N_{TA,offset}/2+N_{delta}+T_{delta}\cdot G_{step})-T_c;$$

$$DTT=DRT-TD.$$

SN denotes the number of advanced OFDM symbols of the URT of IAB1 relative to DRT of IAB1; when SN is a negative value, SN denotes that the URT of IAB1 is in advance of the DRT of IAB1, and when SN is a positive value, SN denotes that the URT of IAB1 lags behind the DRT of IAB1; "SN·ST" may be uniformly denoted as "$T_{offset}$".

In addition, for the case where the target node is IAB1, the first parent node is DgNB and the URT of DgNB is aligned with the DTT of DgNB, IAB1 may determine the TD and the DTT by using the same method as IAB1 in sub-example one of example one.

In addition, for the case where the target node is IAB2, the first parent node is IAB1 and the URT of IAB1 is in advance of the DTT of IAB1, IAB2 may determine the TD and the DTT by using the same method as IAB1 in sub-example two of example one.

Sub-Example Three of Example Three

Figure 10:
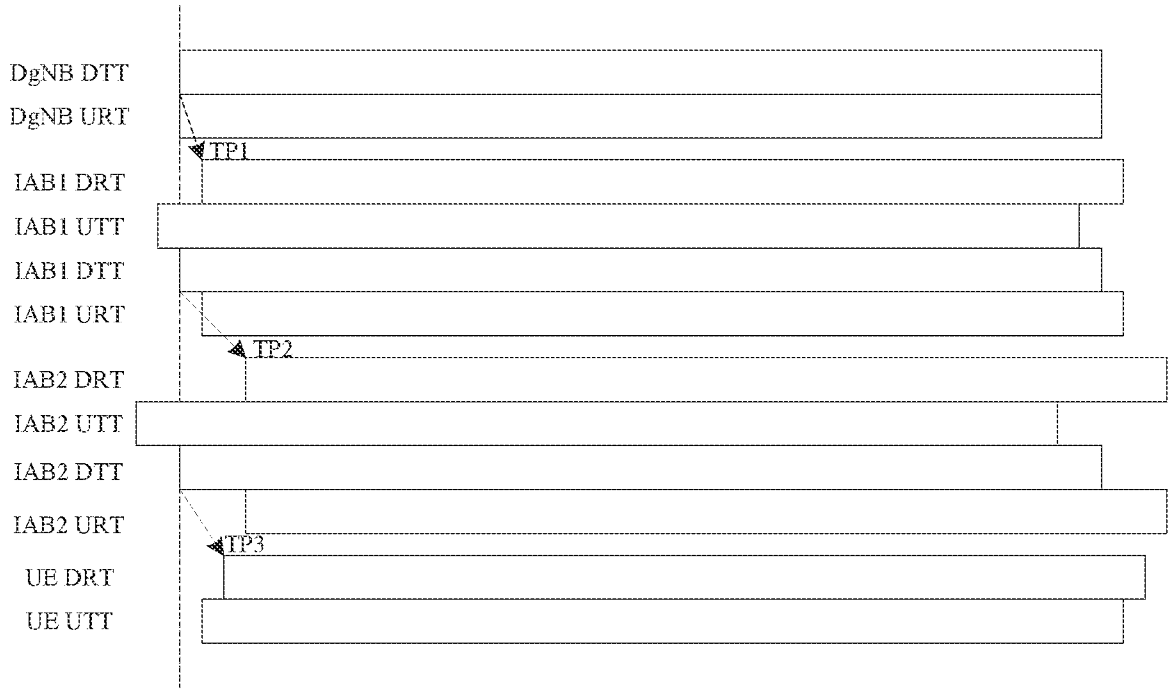
FIG. 10 is a schematic diagram illustrating a slot-level alignment of URT and DRT of a target node according to another embodiment.

FIG. 10 is a schematic diagram illustrating a slot-level alignment of URT and DRT of a target node according to another embodiment. As shown in FIG. 10, the target node is IAB1, a first parent node is DgNB, URT of DgNB is aligned with DTT of DgNB, and TA≥0. In this case, IAB1 may determine a TD and the DTT by using the same method as that in sub-example one of example one.

In addition, the target node is IAB2, the first parent node is IAB1, URT of IAB1 lags behind DTT of IAB1, and TA≥0. In this case, IAB2 may determine the TD and the DTT by using the following method:

$$TD=TA/2+TPup/2 \text{ or } TD=TA/2+TDup/2, \text{ where}$$

$$TPup=TDup=TP1=TD1;$$

$$TA=N_{TA}\cdot T_c \text{ or } TA=(N_{TA}+N_{TA,offset})\cdot T_c;$$

$$DTT=DRT-TD.$$

In addition, for the case where the target node is IAB1, the first parent node is DgNB and the URT of DgNB is aligned with the DTT of DgNB, IAB1 may determine the TD and the DTT by using the same method as IAB1 in sub-example one of example one.

In addition, for the case where the target node is IAB2, the first parent node is IAB1 and the URT of IAB1 lags behind the DTT of IAB1, IAB2 may determine the TD and the DTT by using the same method as IAB1 in sub-example three of example one.

Example Four (for a Fourth Timing Mode)

Sub-Example One of Example Four

Figure 11:
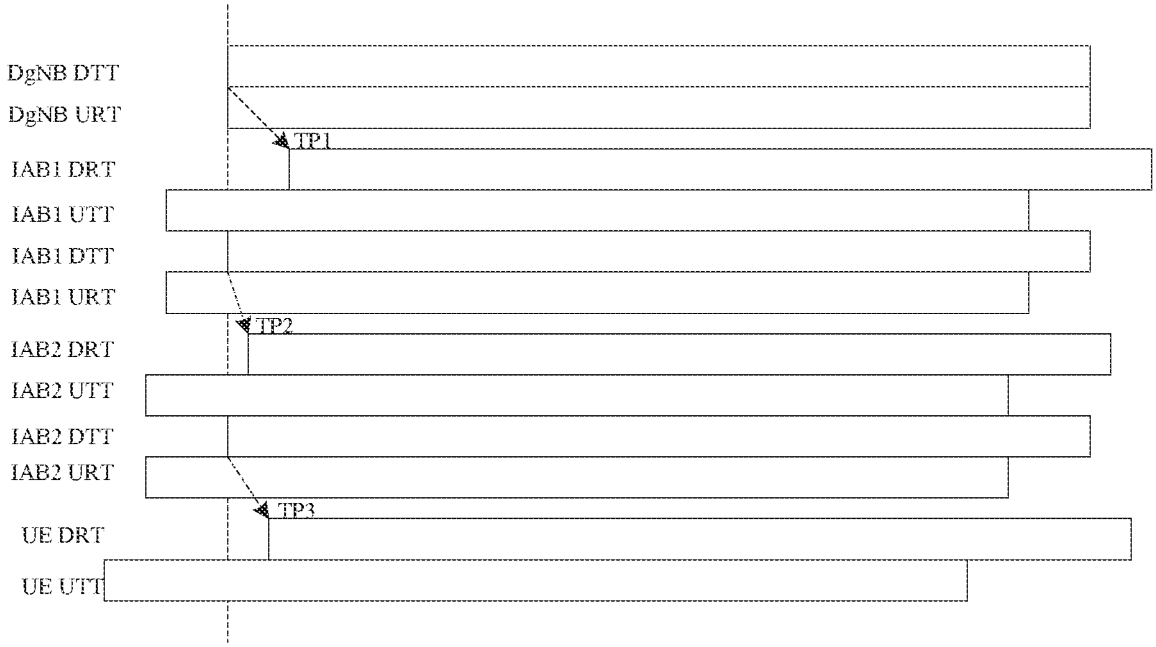
FIG. 11 is a schematic diagram illustrating a slot-level alignment of URT and UTT of a target node according to an embodiment.

FIG. 11 is a schematic diagram illustrating a slot-level alignment of URT and UTT of a target node according to an embodiment. As shown in FIG. 11, the target node is IAB1, a first parent node is DgNB, URT of DgNB is aligned with DTT of DgNB, and TA≥0. In this case, IAB1 may determine a TD and the DTT by using the same method as IAB1 in sub-example one of example one.

In addition, the target node is IAB2, the first parent node is IAB1, URT of IAB1 is in advance of DTT of IAB1, and TA≥0. In this case, IAB2 may determine the TD and the DTT by using the following method:

$$TD=TA/2-TPup/2 \text{ or } TD=TA/2-TDup/2, \text{ where}$$

$$TPup=TDup=TP1=TD1,$$

$$TA=N_{TA}\cdot T_c \text{ or } TA=(N_{TA}+N_{TA,offset})\cdot T_c;$$

$$DTT=DRT-TD.$$

In addition, for the case where the target node is IAB2, the first parent node is IAB1 and the URT of IAB1 is in advance of the DTT of IAB1, IAB2 may determine the TD and the DTT by using the same method as IAB1 in sub-example two of example one.

Sub-Example Two of Example Four

Figure 12:
FIG. 12 is a schematic diagram illustrating a slot-level alignment of UTT and URT of a target node according to an embodiment.

FIG. 12 is a schematic diagram illustrating a slot-level alignment of UTT and URT of a target node according to an embodiment. As shown in FIG. 12, the target node is IAB1, a first parent node is DgNB, and the URT of DgNB lags behind the DTT of DgNB. IAB1 may determine the TD and the DTT by using the same method as IAB1 in sub-example three of example one.

For the case where the target node is IAB2, the first parent node is IAB1 and the URT of IAB1 lags behind the DTT of IAB1, IAB2 may determine the TD and the DTT by using the same method as IAB2 in sub-example one of example two.

Sub-Example Three of Example Four

Figure 13:
FIG. 13 is a schematic diagram illustrating a slot-level alignment of UTT and URT of a target node according to another embodiment.

FIG. 13 is a schematic diagram illustrating a slot-level alignment of UTT and URT of a target node according to another embodiment. As shown in FIG. 13, the target node is IAB1, a first parent node is DgNB, and URT of DgNB lags behind DTT of DgNB. IAB1 may determine a TD and the DTT by using the same method as IAB1 in sub-example four of example one.

For the case where the target node is IAB2, the first parent node is IAB1 and URT of IAB1 lags behind DTT of IAB1, IAB2 may determine the TD and the DTT by using the same method as IAB2 in sub-example one of example two.

Example Five (for a Fifth Timing Mode)

Figure 14:
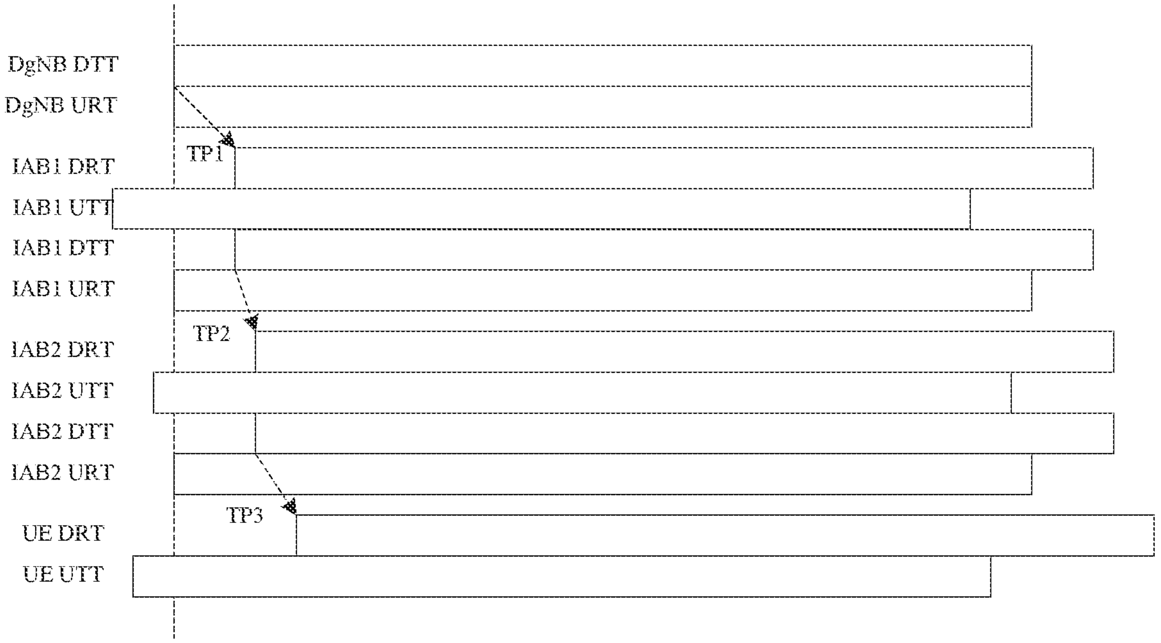
FIG. 14 is a schematic diagram illustrating a slot-level alignment of DTT and DRT of a target node according to an embodiment.

FIG. 14 is a schematic diagram illustrating a slot-level alignment of DTT and DRT of a target node according to an embodiment. As shown in FIG. 14, the target node is IAB1, a first parent node is DgNB, and URT of DgNB is aligned with DTT of DgNB. IAB1 may determine a TD and the DTT by using the same method as IAB1 in sub-example one of example one.

In addition, for the case where the target node is IAB2, the first parent node is IAB1 and URT of IAB1 is in advance of DTT of IAB1, IAB2 may determine the TD and the DTT by using the same method as IAB1 in sub-example two of example one.

In an embodiment, a timing mode is associated with a physical parameter of first type, where the physical parameter of first type includes at least one of a timing argument offset $N_{delta}$, a timing argument index $T_{delta}$ or a timing argument granularity $G_{step}$.

In the present embodiment, each physical parameter of first type may have the same value or different values in different timing modes.

In an embodiment, operation 120 includes the following.

In 1201, DRT of the target node and the time difference between the first timing and the second timing are determined according to the timing parameter.

In 1202, the DTT of the target node is determined according to the DRT of the target node and the time difference.

In an embodiment, in the case where different timing modes coexist in a time-division manner or a frequency-division manner, the DTT of the target node is associated with any predefined timing mode or any timing mode configured by the serving cell or the first parent node, or the DTT of the target node is a weighted value of DTT corresponding to the different timing modes.

In an embodiment, operation 120 includes the following.

In 1203, DRT of the target node, a timing advance and the DTT of the target node are determined according to the timing parameter.

In 1204, the UTT of the target node is determined according to the DRT of the target node, the timing advance and the DTT of the target node.

In an embodiment, in the case where different timing modes coexist in the time-division or frequency-division manner, the UTT of the target node is associated with any predefined timing mode or determined by any timing mode configured by the serving cell or the first parent node, or the UTT of the target node is a weighted value of UTT corresponding to the different timing modes.

In an embodiment, the timing mode is associated with a physical parameter of second type including at least one of a timing advance, a timing argument, a time difference, DRT or UTT.

In the present embodiment, each physical parameter of second type may have the same value or different values in different timing modes.

A process of determining the transmission timing in the case where different timing modes coexist is described below by using an example.

Example Six: (for the Case where Different Timing Modes Coexist)

Sub-Example One of Example Six: Different Timing Modes Coexist in a System in a Time-Division Manner For example, a timing mode corresponding to time t1 is a first timing mode, and a timing mode corresponding to time t2 is a second timing mode. The target node is predefined to determine the transmission timing of the target node in any timing mode, or the target node determines the transmission timing of the target node according to any timing mode configured by a serving cell or a first parent node. For a specific determination manner, reference may be made to the above examples for the corresponding timing modes.

Sub-Example Two of Example Six: Different Timing Modes Coexist in a System in a Frequency-Division Manner For example, a timing mode corresponding to a frequency f1 is a first timing mode, and a timing mode corresponding to a frequency f2 is a third timing mode. The target node is predefined to determine the transmission timing of the target node in any timing mode, or the target node determines the transmission timing of the target node according to any timing mode configured by a serving cell or a first parent node. For a specific determination manner, reference may be made to the above examples for the corresponding timing modes.

Sub-Example Three of Example Six: Different Timing Modes Coexist in a System

For example, the timing modes include a first timing mode, a second timing mode, a third timing mode, a fourth timing mode and a fifth timing mode. The target node is predefined to determine the transmission timing of the target node in any timing mode, or the target node determines the transmission timing of the target node according to any timing mode configured by a serving cell or a first parent node. For a specific determination manner, reference may be made to the above examples for the corresponding timing modes.

Sub-Example Four of Example Six: The Transmission Timing of the Target Node is Determined in a Timing Mode The timing mode corresponds to at least one of the following physical parameters of second type: a timing advance, a timing argument, a time difference, DRT or UTT. Physical quantities of the same type of physical parameter of second type corresponding to different timing modes may have different values.

For example, a timing mode corresponding to time t1 is a first timing mode, and a timing mode corresponding to time t2 is a second timing mode. TA1 denotes a timing advance in the first timing mode, TA2 denotes a timing advance in the second timing mode, T_delta1 denotes a timing argument in the first timing mode, and T_delta2 denotes a timing argument in the second timing mode. TA1 and TA2 may have the same value or different values, and T_delta1 and T_delta2 may have the same value or different values.

Assuming that the target node is an IAB node, the target node determines DTT of an IAB-DU in the first timing mode and determines UTT of an IAB-MT in the first timing mode or the second timing mode.

The DTT of the IAB-DU is determined according to the following manner:

$TD1=TA1/2-Tg1/2$ or $TD1=TA1/2+T\_delta1$, where $TA1\geq 0$, $-Tg1/2=T\_delta1\leq 0$, $TA1=N_{TA1}\cdot T_c$ or $TA1=(N_{TA}1+N_{TA,offset1})\cdot T_c$, $DTT=DRT1-TD1$.

In the first timing mode, the UTT of the IAB-MT can be determined according to the following manner:

$UTT1=DRT1-TA1$ or $UTT1=DRT1+TA1$.

In the second timing mode, the UTT of the IAB-MT can be determined according to the following manner:

$UTT2=DRT2-TA2$ or $UTT2=DRT2-TA2-SN\cdot ST$ or $UTT2=DRT2+TA2$ or $UTT2=DRT2+TA2-SN\cdot ST$ or $UTT2=DTT2$ or $UTT2=DTT2-SN\cdot ST$.

Here, the minus sign denotes that the UTT is in advance of the DRT or in advance of the DTT.

Sub-Example Five of Example Six: Transmission Timing of Multiple Timing Modes is Weighted to Determine the Transmission Timing of the Target Node The timing mode corresponds to at least one of the following physical parameters of second type: a timing advance, a timing argument, a time difference, DRT or UTT. Physical parameters of the same type among physical parameters of second type corresponding to different timing modes may have different values.

For example, a timing mode corresponding to time t1 is a first timing mode, and a timing mode corresponding to time t2 is a third timing mode. TA1 denotes a timing advance in the first timing mode, TA2 denotes a timing advance in the third timing mode, T_delta1 denotes a timing argument in the first timing mode, and T_delta2 denotes a timing argument in the third timing mode. Here, TA1 and TA2 may have the same value or different values, and T_delta1 and T_delta2 may have the same value or different values.

Assuming that the target node is an IAB node, the target node determines DTT1 of an IAB-DU in the first timing mode and determines DTT2 of the IAB-DU in the third timing mode, and DTT finally determined by the target node may be determined by the DTT1, determined by the DTT2 or determined by weighting the DTT1 and the DTT2. The target node simultaneously performs the downlink reception of an IAB-MT and the uplink reception of the IAB-DU in the third timing mode.

In the first timing mode, the DTT1 of the IAB-DU can be determined according to the following manner:

$TD1=TA1/2-Tg1/2$ or $TD1=TA1/2+T\_delta1$, where $TA1\geq 0$, $-Tg1/2=T\_delta1\leq 0$, $TA1=N_{TA1}\cdot T_c$ or $TA1=(N_{TA}1+N_{TA,offset1})\cdot T_c$;

$DTT1=DRT1-TD1$.

In the third timing mode, the DTT2 of the IAB-DU can be determined according to the following manner:

$TD2=TA2/2-Tg2/2$ or $TD2=TA2/2+T\_delta2$, where $TA2\geq 0$, $-Tg2/2=T\_delta2\leq 0$, $TA2=N_{TA2}\cdot T_c$ or $TA2=(N_{TA2}+N_{TA,offset2})\cdot T_c$;

$DTT2=DRT2-TD2$.

The finally determined DTT can be determined by weighting the DTT1 and the DTT2:

$DTT=\alpha DTT1-\beta\cdot DTT2$.

UTT of the IAB-MT in the first timing mode:

$UTT1=DRT1-TA1$ or $UTT1=DRT1+TA1$.

UTT of the IAB-MT in the third timing mode:

$UTT2=DRT2-TA2$ or $UTT2=DRT2-TA2-SN\cdot ST$ or $UTT2=DRT2+TA2$ or $UTT2=DRT2+TA2-SN\cdot ST$.

Here, the minus sign denotes that the UTT is in advance of the DRT.

In an embodiment, the number of advanced or lagged OFDM symbols of the third timing relative to the fourth timing includes at least one of:

- the number of advanced or lagged OFDM symbols of the UTT of the target node relative to the timing advance of the target node;
- the number of advanced or lagged OFDM symbols of the UTT of the target node relative to the DTT of the target node;
- the number of advanced or lagged OFDM symbols of the URT of the target node relative to the DRT of the target node;
- the number of advanced or lagged OFDM symbols of the UTT of the target node relative to the URT of the target node; or
- the number of advanced or lagged OFDM symbols of the DTT of the target node relative to the DRT of the target node.

In an embodiment, the propagation time between the first parent node and the second parent node is configured by the serving cell or the first parent node, and the time difference between the first timing (DTT) and the second timing (DRT) is configured by the serving cell or the first parent node.

In an embodiment, the time of the advanced or lagged symbols of the third timing of the target node relative to the fourth timing of the target node is determined according to a cyclic prefix duration and a symbol pure duration, where the cyclic prefix duration includes at least one of a zero-duration cyclic prefix, a normal cyclic prefix or an extended cyclic prefix, and the symbol pure duration is equal to a reciprocal of the subcarrier spacing ($1/\Delta f$).

In an embodiment, the method further includes the following.

In 130, the number of advanced or lagged OFDM symbols of third timing relative to fourth timing is determined according to a predefined manner.

In an embodiment, operation 130 specifically includes the following.

A default value of the number of OFDM symbols is determined according to a node physical distance between a first parent node and the target node.

In an embodiment, the method further includes the following.

In 140, the number of advanced or lagged OFDM symbols of third timing relative to fourth timing is determined according to configuration signaling.

The configuration signaling includes physical-layer signaling, medium access control (MAC) layer signaling, radio resource control (RRC) signaling and Operation Administration and Maintenance (OAM) signaling.

A process of determining the number (SN) of advanced or lagged OFDM symbols of the third timing relative to the fourth timing is described below by using an example.

Example Seven

To avoid the generation of a negative value TA, the OFDM symbols may be advanced or lagged, for example:

for a first timing mode, UTT is advanced or lagged by several OFDM symbols relative to a calculated timing advance;

for a second timing mode, the UTT is advanced or lagged by several OFDM symbols relative to DTT;

for a third timing mode, URT is advanced or lagged by several OFDM symbols relative to DRT;

for a fourth timing mode, the UTT is advanced or lagged by several OFDM symbols relative to the URT;

for a fifth timing mode, the DTT is advanced or lagged by several OFDM symbols relative to the DRT.

The number of several advanced or lagged OFDM symbols above is determined by a predefined or configured manner, where the predefined manner includes determining a default value according to a node spacing, and the configured manner includes physical-layer signaling (for example, downlink control information (DCI)), MAC layer signaling (for example, an MAC-CE), RRC layer signaling (for example, broadcast signaling or dedicated signaling) and OAM signaling.

Figure 15:
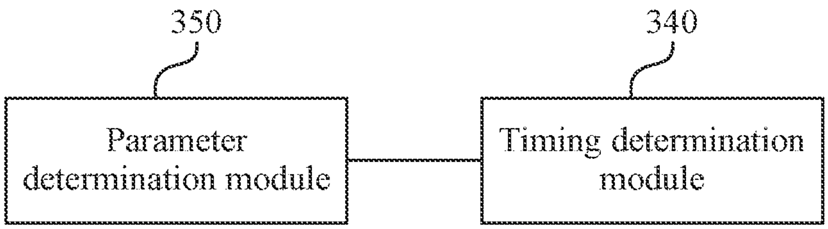
FIG. 15 is a structure diagram of a timing determination device according to an embodiment.

Embodiments of the present application further provide a timing determination device. FIG. 15 is a structure diagram of a timing determination device according to an embodiment. As shown in FIG. 15, the timing determination device includes a parameter determination module 210 and a timing determination module 220.

The parameter determination module 210 is configured to determine a timing parameter.

The timing determination module 220 is configured to determine transmission timing of a target node according to the timing parameter, where the transmission timing includes at least one of a time difference between first timing and second timing, DTT or UTT.

The timing determination device of the present embodiment determines at least one of the time difference or the DTT and UTT of the target node according to the timing parameter, thereby flexibly and accurately determining the transmission timing.

In an embodiment, the timing parameter includes at least one of a timing advance, a timing argument or a time difference parameter.

In an embodiment, the first timing is DTT of a serving cell or a first parent node, and the second timing is DRT of the target node.

In an embodiment, the timing parameter includes a timing advance, and the device further includes a timing advance determination module.

The timing advance determination module is configured to determine the timing advance according to at least one of a timing advance offset, a timing advance index or a timing advance granularity.

In an embodiment, the timing parameter includes a timing argument, and the device further includes a timing argument determination module.

The timing argument determination module is configured to determine the timing argument according to at least one of a timing argument offset, a timing argument index or a timing argument granularity.

In an embodiment, the timing parameter includes a time difference parameter, where the time difference parameter includes at least one of:

propagation time between the first parent node and a second parent node;

a time difference between the first timing and the second timing determined by the first parent node;

the number of advanced or lagged OFDM symbols of third timing of the target node relative to fourth timing of the target node;

time of the advanced or lagged OFDM symbols of the third timing of the target node relative to the fourth timing of the target node; or an advanced or lagged subcarrier spacing of the third timing of the target node relative to the fourth timing of the target node.

In an embodiment, the propagation time and the time difference are configured by the serving cell or configured by the first parent node.

In an embodiment, the time of the symbols is determined according to a cyclic prefix duration and a symbol pure duration, where the cyclic prefix duration includes at least one of a zero-duration cyclic prefix, a normal cyclic prefix or an extended cyclic prefix, and the symbol pure duration is equal to a reciprocal of the subcarrier spacing.

In an embodiment, the transmission timing includes the timing difference between the first timing and the second timing, where the time difference is determined according to at least one of the following manners:

$TD=TA/2$; $TD=TA$;

$TD=TA/2-Tg/2$; $TD=TA/2+T\_delta$;

$TD=-|TA|/2+Tg/2$; $TD=-|TA|/2+T\_delta$;

$TD=-TA/2+Tg/2$; $TD=-TA/2+T\_delta$;

$TD=TA/2\pm SN\cdot ST$; $TD=TA+SN\cdot ST$;

$TD=TA/2-Tg/2\pm SN\cdot ST$; $TD=TA/2+T\_delta\pm SN\cdot ST$;

$TD=-|TA|/2+Tg/2+SN\cdot ST$; $TD=-|TA|/2+T\_delta\pm SN\cdot ST$;

$TD=-TA/2-Tg/2+SN\cdot ST$; $TD=-TA/2+T\_delta\pm SN\cdot ST$;

$TD=TA/2+TPup/2$; $TD=TA/2+TDup/2$;

$TD=-|TA|/2+TPup/2$; $TD=-|TA|/2+TDup/2$;

$TD=-TA/2+TPup/2$; $TD=-TA/2+TDup/2$;

$TD=TA/2-(SN\cdot ST-TPup)/2$; $TD=TA/2-(SN\cdot ST-TDup)/2$; or $TD=TA/2-TPup/2$; $TD=TA/2-TDup/2$;

where TD denotes the time difference between the first timing and the second timing, the first timing is the DTT of the serving cell or the first parent node, and the second timing is the DRT of the target node; TA denotes the timing advance, $T_g$ denotes a time difference between URT of the first parent node and the DTT of the first parent node, SN denotes the number of advanced or lagged OFDM symbols of the third timing of the target node relative to the fourth timing of the target node, ST denotes the time of the advanced or lagged OFDM symbols of the third timing of the target node relative to the fourth timing of the target node, TPup denotes the propagation time between the first parent node and the second parent node, TDup denotes the time difference between the first timing and the second timing determined by the first parent node, and T_delta denotes the timing argument.

In an embodiment, the transmission timing includes a timing advance, where the timing advance is determined according to at least one of the following manners:

$$TA=N_{TA}\cdot T_c;$$

$$TA=(N_{TA}+N_{TA,offset})\cdot T_c;$$

$$TA=-N_{TA}\cdot T_c;\ \text{or}$$

$$TA=-(N_{TA}+N_{TA,offset})\cdot T_c;$$

where TA denotes the timing advance, $N_{TA}$ denotes a timing advance adjustment number or a timing lag adjustment number, $N_{TA,offset}$ denotes a timing advance offset or a timing lag offset, and $T_c$ denotes a time unit.

In an embodiment, the transmission timing includes a timing argument, where the timing argument is determined according to at least one of the following manners:

$$T\_delta=(N_{delta}+T_{delta}\cdot G_{step})\cdot T_c;$$

$$T\_delta=(-N_{TA,offset}/2+N_{delta}+T_{delta}\cdot G_{step})\cdot T_c;$$

$$T\_delta=(N_{TA,offset}/2+N_{delta}+T_{delta}\cdot G_{step})\cdot T_c;$$

where T_delta denotes the timing argument, $N_{TA}$ denotes a timing advance adjustment number or a timing lag adjustment number, $N_{TA,offset}$ denotes a timing advance offset or a timing lag offset, $T_c$ denotes a time unit, $T_{delta}$ denotes a timing argument index value, $N_{delta}$ denotes a timing argument offset, and $G_{step}$ denotes a timing argument granularity.

In an embodiment, a timing mode is associated with a physical parameter of first type, where the physical parameter of first type includes at least one of a timing argument offset, a timing argument index or a timing argument granularity.

In an embodiment, the timing determination module 220 includes a first determination unit and a second determination unit.

The first determination unit is configured to determine DRT of the target node and the time difference between the first timing and the second timing according to the timing parameter.

The second determination unit is configured to determine the DTT of the target node according to the DRT of the target node and the time difference.

In an embodiment, in the case where different timing modes coexist in a time-division manner or a frequency-division manner, the DTT of the target node is associated with any predefined timing mode or any timing mode configured by the serving cell or the first parent node, or the DTT of the target node is a weighted value of DTT corresponding to the different timing modes.

In an embodiment, the timing determination module 220 includes a third determination unit and a fourth determination unit.

The third determination unit is configured to determine DRT of the target node, a timing advance and the DTT of the target node according to the timing parameter.

The fourth determination unit is configured to determine the UTT of the target node according to the DRT of the target node, the timing advance and the DTT of the target node.

In an embodiment, in the case where different timing modes coexist in the time-division or frequency-division manner, the UTT of the target node is associated with any predefined timing mode or determined by any timing mode configured by the serving cell or the first parent node, or the UTT of the target node is a weighted value of UTT corresponding to the different timing modes.

In an embodiment, the timing mode is associated with a physical parameter of second type including at least one of a timing advance, a timing argument, a time difference, DRT or UTT.

In an embodiment, the number of advanced or lagged OFDM symbols of the third timing relative to the fourth timing includes at least one of:

the number of advanced or lagged OFDM symbols of the UTT of the target node relative to a timing advance of the target node;

the number of advanced or lagged OFDM symbols of the UTT of the target node relative to the DTT of the target node;

the number of advanced or lagged OFDM symbols of URT of the target node relative to the DRT of the target node;

the number of advanced or lagged OFDM symbols of the UTT of the target node relative to the URT of the target node; or the number of advanced or lagged OFDM symbols of the DTT of the target node relative to the DRT of the target node.

In an embodiment, the device further includes a first symbol number determination module.

The first symbol number determination module is configured to determine the number of advanced or lagged OFDM symbols of third timing relative to fourth timing according to a predefined manner.

The symbol number determination module is specially configured to determine a default value of the number of OFDM symbols according to a node physical distance between a first parent node and the target node.

In an embodiment, the device further includes a second symbol number determination module.

The second symbol number determination module is configured to determine the number of advanced or lagged OFDM symbols of third timing relative to fourth timing according to configuration signaling.

The configuration signaling includes physical-layer signaling, MAC layer signaling, RRC signaling and OAM signaling.

The timing determination device provided in the present embodiment and the timing determination method provided in the preceding embodiments belong to the same concept. For technical details not described in detail in the present embodiment, reference may be made to any one of the preceding embodiments. The present embodiment has the same beneficial effects as the timing determination method performed.

Figure 16:
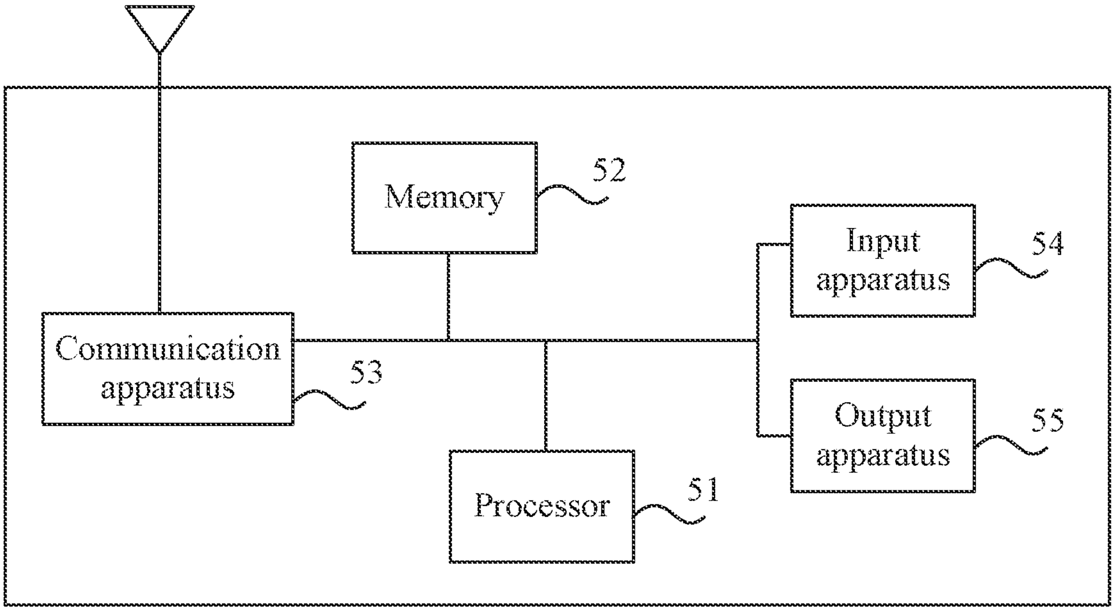
FIG. 16 is a structure diagram of hardware of a communication node according to an embodiment.

Embodiments of the present application further provide a communication node. FIG. 16 is a structure diagram of hardware of a communication node according to an embodiment. As shown in FIG. 16, the communication node provided in the present application includes a memory 52, a processor 51 and a computer program stored in the memory 52 and executable by the processor 51, where the processor 51, when executing the program, implements the above timing determination method.

The communication node may further include the memory 52; one or more processors 51 may be provided in the communication node, and one processor 51 is used as an example in FIG. 16; the memory 52 is configured to store one or more programs; when executed by the one or more processors 51, the one or more programs cause the one or more processors 51 to implement the timing determination method in the embodiments of the present application.

The communication node further includes a communication apparatus 53, an input apparatus 54 and an output apparatus 55.

The processor 51, the memory 52, the communication apparatus 53, the input apparatus 54 and the output apparatus 55 in the communication node may be connected through a bus or in other manners, and the connection through the bus is used as an example in FIG. 16.

The input apparatus 54 may be configured to receive inputted digital or character information and generate key signal input related to user settings and function control of the communication node. The output apparatus 55 may include a display device such as a display screen.

The communication apparatus 53 may include a receiver and a sender. The communication apparatus 53 is configured to perform information transceiving communication under the control of the processor 51.

As a computer-readable storage medium, the memory 52 may be configured to store software programs, computer-executable programs and modules, such as program instructions/modules (for example, the parameter determination module 210 and the timing determination module 220 in the timing determination device) corresponding to the timing determination method in the embodiments of the present application. The memory 52 may include a program storage region and a data storage region, where the program storage region may store an operating system and an application program required by at least one function, and the data storage region may store data or the like created according to the use of the communication node. Additionally, the memory 52 may include a high-speed random-access memory and may also include a non-volatile memory, such as at least one magnetic disk memory, a flash memory or another non-volatile solid-state memory. In some examples, the memory 52 may further include memories located remotely relative to the processors 51, and these remote memories may be connected to the communication node via a network. Examples of the preceding network include, but are not limited to, the Internet, an intranet, a local area network, a mobile communication network and a combination thereof.

Embodiments of the present application further provide a storage medium storing a computer program, where the computer program, when executed by a processor, implements the timing determination method according to any one of the embodiments of the present application. The method includes: determining a timing parameter; and determining transmission timing of a target node according to the timing parameter, where the transmission timing includes at least one of a time difference between first timing and second timing, DTT or UTT.

A computer storage medium in the embodiments of the present application may adopt any combination of one or more computer-readable media. The computer-readable media may be computer-readable signal media or computer-readable storage media. A computer-readable storage medium may be, for example, but is not limited to, an electrical, magnetic, optical, electromagnetic, infrared, or semiconductor system, apparatus, or device or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof. The computer-readable storage medium may be any tangible medium including or storing a program. The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may further include conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case related to the remote computer, the remote computer may be connected to the user computer via any type of network including a local area network (LAN) or a wide area network (WAN) or may be connected to an external computer (for example, via the Internet through an Internet service provider).

The preceding are only example embodiments of the present application and are not intended to limit the scope of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, various embodiments of the present application may be implemented in hardware or dedicated circuits, software, logic or any combination thereof. For example, some aspects may be implemented in hardware while other aspects may be implemented in firmware or software executable by a controller, a microprocessor or other computing apparatuses, though the present application is not limited thereto.

The embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disk (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A timing determination method, comprising:

determining a timing parameter; and determining transmission timing of a target node according to the timing parameter, wherein the transmission timing comprises at least one of: a time difference between first timing and second timing, downlink transmit timing (DTT) or uplink transmit timing (UTT);

wherein the time difference between first timing and second timing refers to a time difference between the DTT of a serving cell and downlink receive timing (DRT) of an integrated access and backhaul (IAB) node, the DTT refers to DTT of the IAB node, and the UTT refers to UTT of the IAB node;

wherein the transmission timing comprises a timing argument;

wherein the timing argument is determined according to at least one of the following manners:

$$T_{delta}=(N_{delta}+T_{delta}\cdot G_{step})\cdot T_c;$$

$$T_{delta}=(-N_{TA,offset}/2+N_{delta}+T_{delta}\cdot G_{step})\cdot T_c; \text{ or}$$

$$T_{delta}=(N_{TA,offset}/2+N_{delta}+T_{delta}\cdot G_{step})\cdot T_c;$$

wherein $T_{delta}$ denotes the timing argument, $N_{TA}$ denotes a timing advance adjustment number or a timing lag adjustment number, $N_{TA,offset}$ denotes a timing advance offset or a timing lag offset, $T_c$ denotes a time unit, $T_{delta}$ denotes a timing argument index value, $N_{delta}$ denotes a timing argument offset, and $G_{step}$ denotes a timing argument granularity.

2. The method according to claim 1, wherein the timing parameter comprises at least one of:

a timing advance, the timing argument or a time difference parameter.

3. The method according to claim 1, wherein the first timing is DTT of the serving cell or a first parent node, and the second timing is DRT of the target node.

4. The method according to claim 1, wherein the timing parameter comprises a timing advance; and the method further comprises:

determining the timing advance according to at least one of a timing advance offset, a timing advance index or a timing advance granularity.

5. The method according to claim 1, wherein the timing parameter comprises a timing argument; and the method further comprises:

determining the timing argument according to at least one of a timing argument offset, a timing argument index or a timing argument granularity.

6. The method according to claim 1, wherein the timing parameter comprises a time difference parameter;

wherein the time difference parameter comprises at least one of:

propagation time between a first parent node and a second parent node;

a time difference between the first timing and the second timing determined by the first parent node;

a number of advanced or lagged orthogonal frequency-division multiplexing (OFDM) symbols of third timing of the target node relative to fourth timing of the target node;

time of the advanced or lagged OFDM symbols of the third timing of the target node relative to the fourth timing of the target node; or an advanced or lagged subcarrier spacing of the third timing of the target node relative to the fourth timing of the target node.

7. The method according to claim 6, wherein the propagation time and the time difference between the first timing and the second timing determined by the first parent node are configured by a serving cell or configured by the first parent node.

8. The method according to claim 6, wherein the time of the OFDM symbols is determined according to a cyclic prefix duration and a symbol pure duration;

wherein the cyclic prefix duration comprises at least one of: a zero-duration cyclic prefix, a normal cyclic prefix or an extended cyclic prefix; and the symbol pure duration is equal to a reciprocal of the subcarrier spacing.

9. The method according to claim 6, wherein the number of advanced or lagged OFDM symbols of the third timing of the target node relative to the fourth timing of the target node comprises: at least one of:

a number of advanced or lagged OFDM symbols of the UTT of the target node relative to a timing advance of the target node;

a number of advanced or lagged OFDM symbols of the UTT of the target node relative to the DTT of the target node;

a number of advanced or lagged OFDM symbols of URT of the target node relative to DRT of the target node;

a number of advanced or lagged OFDM symbols of the UTT of the target node relative to the URT of the target node; or a number of advanced or lagged OFDM symbols of the DTT of the target node relative to the DRT of the target node.

10. The method according to claim 6, further comprising: determining the number of advanced or lagged OFDM symbols of the third timing of the target node relative to the fourth timing of the target node according to a predefined manner; and the determining the number of advanced or lagged OFDM symbols of the third timing of the target node relative to the fourth timing of the target node according to the predefined manner comprises:

determining a default value of the number of OFDM symbols according to a node physical distance between the first parent node and the target node.

11. The method according to claim 6, further comprising:

determining the number of advanced or lagged OFDM symbols of the third timing of the target node relative to the fourth timing of the target node according to configuration signaling;

wherein the configuration signaling comprises physical-layer signaling, medium access control (MAC) layer signaling, radio resource control (RRC) signaling and Operation Administration and Maintenance (OAM) signaling.

12. The method according to claim 1, wherein the transmission timing comprises the time difference between the first timing and the second timing;

wherein the time difference is determined according to at least one of the following manners:

$$TD=TA/2;\ TD=TA;$$

$$TD=TA/2-Tg/2;\ TD=TA/2+T_{delta},$$

$$TD=-|TA|/2+Tg/2;\ TD=-|TA|/2+T_{delta};$$

$$TD=-TA/2+Tg/2;\ TD=-TA/2+T_{delta};$$

$$TD=TA/2+SN\cdot ST;\ TD=TA+SN\cdot ST;$$

$$TD=TA/2-Tg/2+SN\cdot ST;\ TD=TA/2+T_{delta}+SN\cdot ST;$$

$$TD=-|TA|/2+Tg/2+SN\cdot ST;\ TD=-|TA|/2+T_{delta}+SN\cdot ST;$$

$$TD=-TA/2-Tg/2+SN\cdot ST;\ TD=-TA/2+T_{delta}+SN\cdot ST;$$

$$TD=TA/2+TPup/2;\ TD=TA/2+TDup/2;$$

$$TD=-|TA|/2+TPup/2;\ TD=-|TA|/2+TDup/2;$$

$$TD=-TA/2+TPup/2;\ TD=-TA/2+TDup/2;$$

$$TD=TA/2-(SN\cdot ST-TPup)/2;\ TD=TA/2-(SN\cdot ST-TDup)/2;\ \text{or}$$

$$TD=TA/2-TPup/2;\ TD=TA/2-TDup/2;$$

wherein TD denotes the time difference between the first timing and the second timing, the first timing is DTT of a serving cell or a first parent node, and the second timing is DRT of the target node; TA denotes a timing advance, Tg denotes a time difference between uplink receive timing (URT) of the first parent node and the DTT of the first parent node, SN denotes the number of advanced or lagged OFDM symbols of third timing of the target node relative to fourth timing of the target node, ST denotes time of the advanced or lagged OFDM symbols of the third timing of the target node relative to the fourth timing of the target node, TPup denotes propagation time between the first parent node and a second parent node, TDup denotes a time difference between the first timing and the second timing determined by the first parent node, and $T_{delta}$ denotes a timing argument.

13. The method according to claim 1, wherein the transmission timing comprises a timing advance;

wherein the timing advance is determined according to at least one of the following manners:

$$TA=N_{TA}\cdot T_c;$$

$$TA=(N_{TA}+N_{TA,offset})\cdot T_c;$$

$$TA=-N_{TA}\cdot T_c;\ \text{or}$$

$$TA=-(N_{TA}+N_{TA,offset})\cdot T_c;$$

wherein TA denotes the timing advance, $N_{TA}$ denotes a timing advance adjustment number or a timing lag adjustment number, $N_{TA,offset}$ denotes a timing advance offset or a timing lag offset, and $T_c$ denotes a time unit.

14. The method according to claim 1, wherein a timing mode is associated with a physical parameter of first type;

wherein the physical parameter of first type comprises at least one of a timing argument offset, a timing argument index or a timing argument granularity.

15. The method according to claim 1, wherein determining the transmission timing of the target node according to the timing parameter comprises:

determining DRT of the target node and the time difference between the first timing and the second timing according to the timing parameter; and determining the DTT of the target node according to the DRT of the target node and the time difference.

16. The method according to claim 1, wherein determining the transmission timing of the target node according to the timing parameter comprises:

determining DRT of the target node, a timing advance and the DTT of the target node according to the timing parameter; and determining the UTT of the target node according to the DRT of the target node, the timing advance and the DTT of the target node.

17. The method according to claim 1, wherein a timing mode is associated with a physical parameter of second type, wherein the physical parameter of second type comprises: at least one of a timing advance, the timing argument, a time difference, DRT or UTT.

18. A communication node, comprising a memory, a processor and a computer program stored in the memory and executable by the processor, wherein the processor, when executing the computer program, implements a timing determination method, wherein the timing determination method comprises:

determining a timing parameter; and determining transmission timing of a target node according to the timing parameter, wherein the transmission timing comprises at least one of: a time difference between first timing and second timing, downlink transmit timing (DTT) or uplink transmit timing (UTT);

wherein the time difference between first timing and second timing refers to a time difference between the DTT of a serving cell and downlink receive timing (DRT) of an integrated access and backhaul (IAB) node, the DTT refers to DTT of the IAB node, and the UTT refers to UTT of the IAB node;

wherein the transmission timing comprises a timing argument;

wherein the timing argument is determined according to at least one of the following manners:

$$T_{delta}=(N_{delta}+T_{delta}\cdot G_{step})\cdot T_c;$$

$$T_{delta}=(-N_{TA,offset}/2+N_{delta}+T_{delta}\cdot G_{step})\cdot T_c;\ \text{or}$$

$$T_{delta}=(N_{TA,offset}/2+N_{delta}+T_{delta}\cdot G_{step})\cdot T_c;$$

wherein $T_{delta}$ denotes the timing argument, $N_{TA}$ denotes a timing advance adjustment number or a timing lag adjustment number, $N_{TA,offset}$ denotes a timing advance offset or a timing lag offset, $T_c$ denotes a time unit, $T_{delta}$ denotes a timing argument index value, $N_{delta}$ denotes a timing argument offset, and $G_{step}$ denotes a timing argument granularity.

19. A non-transitory computer-readable storage medium storing a computer program, wherein the computer program, when executed by a processor, implements a timing determination method, wherein the timing determination method comprises:

determining a timing parameter; and determining transmission timing of a target node according to the timing parameter, wherein the transmission timing comprises at least one of: a time difference between first timing and second timing, downlink transmit timing (DTT) or uplink transmit timing (UTT);

wherein the time difference between first timing and second timing refers to a time difference between the DTT of a serving cell and downlink receive timing (DRT) of an integrated access and backhaul (IAB) node, the DTT refers to DTT of the IAB node, and the UTT refers to UTT of the IAB node;

wherein the transmission timing comprises a timing argument;

wherein the timing argument is determined according to at least one of the following manners:

$$T_{delta}=(N_{delta}+T_{delta}\cdot G_{step})\cdot T_c;$$

$$T_{delta}=(-N_{TA,offset}/2+N_{delta}+T_{delta}\cdot G_{step})\cdot T_c;\text{ or}$$

$$T_{delta}=(N_{TA,offset}/2+N_{delta}+T_{delta}\cdot G_{step})\cdot T_c;$$

wherein $T_{delta}$ denotes the timing argument, $N_{TA}$ denotes a timing advance adjustment number or a timing lag adjustment number, $N_{TA,offset}$ denotes a timing advance offset or a timing lag offset, $T_c$ denotes a time unit, $T_{delta}$ denotes a timing argument index value, $N_{delta}$ denotes a timing argument offset, and $G_{step}$ denotes a timing argument granularity.

* * * * *